INVENTORS
LAMBERT HANER
FORREST D. SARVER
BY
Richard H. MacCutcheon
ATTORNEY.

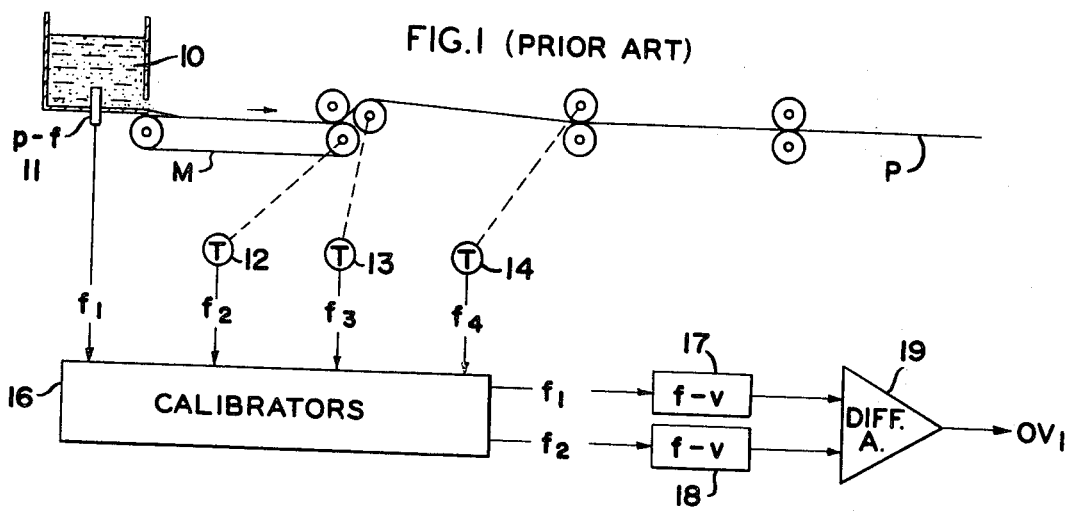
FIG.1 (PRIOR ART)
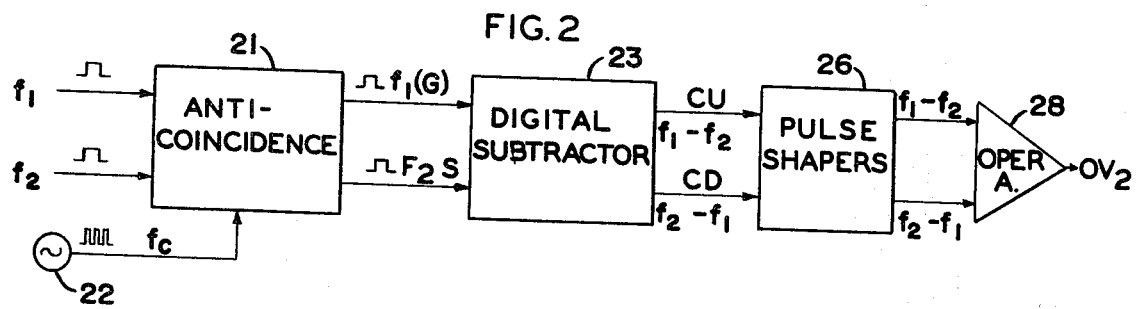
FIG. 2
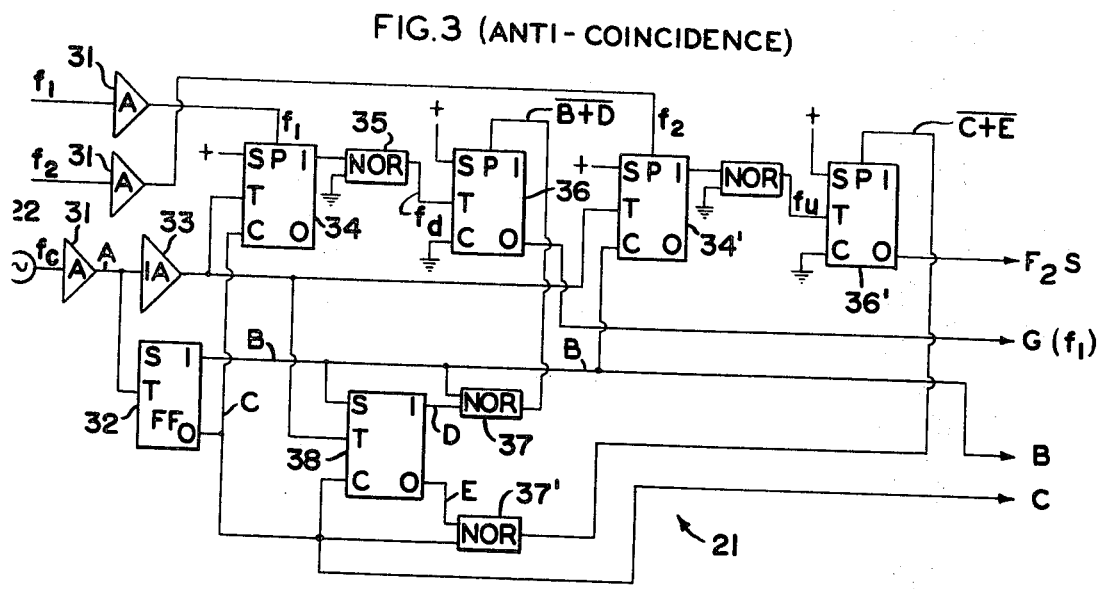
FIG.3 (ANTI-COINCIDENCE)
INVENTORS
LAMBERT HANER
FORREST D. SARVER
BY
*Richard H. MacCutcheon*
ATTORNEY.

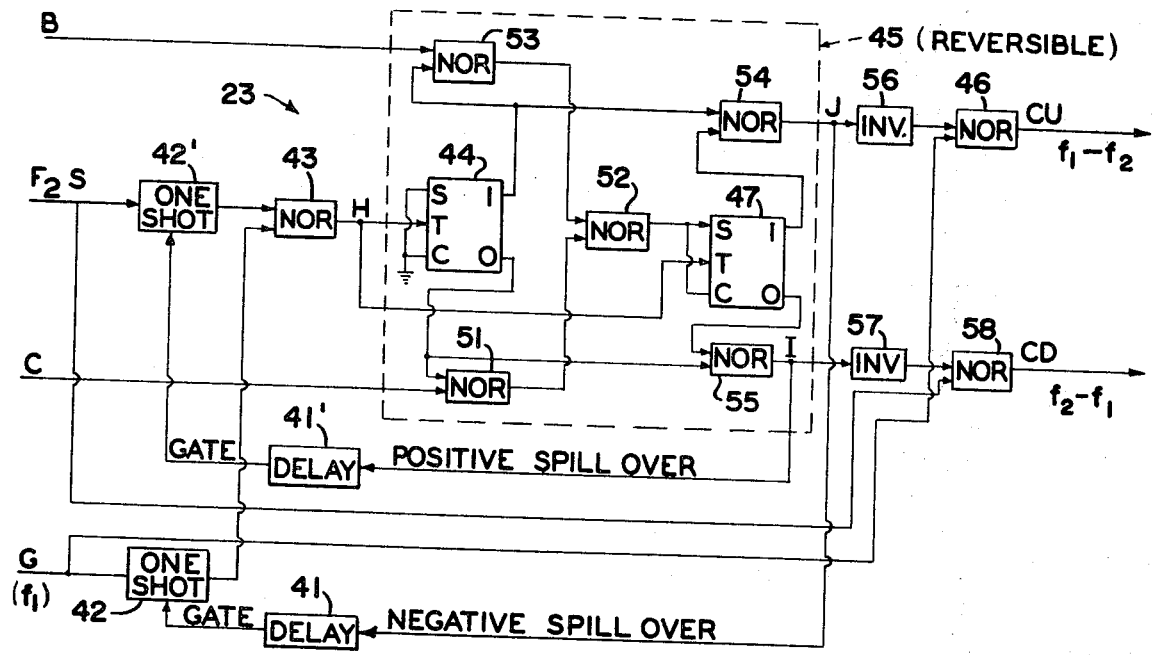
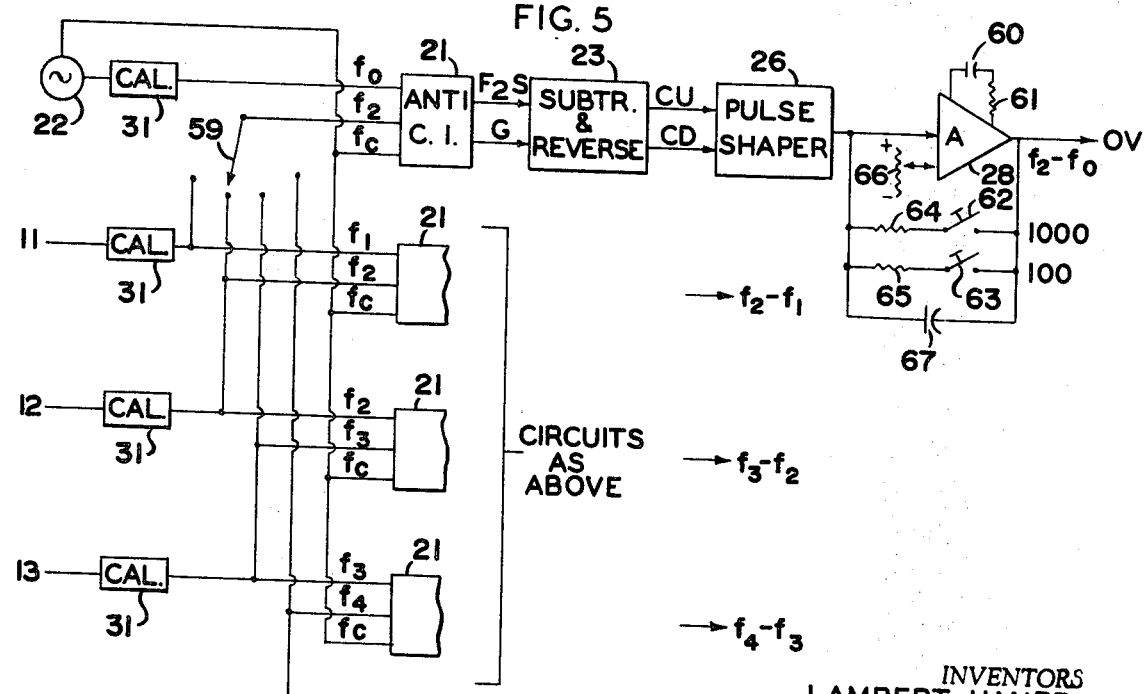

United States Patent Office 3,534,261
Patented Oct. 13, 1970

3,534,261
FREQUENCY DIFFERENCE COUNTER EMPLOYING DIGITAL SUBTRACTION OF PULSES
Lambert Haner, Rocky River, and Forrest D. Sarver, Berea, Ohio, assignors to Avtron Manufacturing, Inc., Cleveland, Ohio, a corporation of Ohio
Filed July 21, 1967, Ser. No. 655,171
Int. Cl. G01r 23/00
U.S. Cl. 324—79                                    3 Claims

ABSTRACT OF THE DISCLOSURE

A frequency differencing apparatus useful as a speed difference counter has anti-coincidence circuitry followed by digital subtraction to provide a differential frequency which is later converted to an output voltage representative of the frequency difference.

BACKGROUND OF THE INVENTION

The present invention relates to frequency differencing apparatus useful for measurement, readout and control of sample material speed and sample material speed differences from point to point (i.e., draw). Heretofore, the frequency differencing, for example as used to determine draw in a paper mill, has been accomplished by converting plural outputs from plural transducers each to a representative voltage and then subtracting the voltages as in a difference amplifier. Accuracy of this method has left much to be desired.

SUMMARY OF THE INVENTION

According to one aspect of the present invention, various objects are met and many advantages provided by taking two pulse trains representative, for example, of two mechanical process speeds, processing them digitally in apparatus which provides, first anti-coincidence, and second digital subtraction and thereafter converting a pulse train (representative of the difference) to an analog voltage whereby to provide a measurement accuracy which is one hundred to several hundred times as great as that of the prior art apparatus.

BRIEF DESCRIPTION OF THE DRAWINGS

Various advantages of the invention will become apparent and the invention may be better understood from consideration of the following description, taken in connection with the accompanying drawing(s) in which:

FIG. 1 is an illustrative part mechanical, part electrical-block diagram of a prior art arrangement;

FIG. 2 is an electrical block diagram showing functional circuitry employed according to one aspect of the invention;

FIG. 3 shows a schematic diagram of anti-coincidence circuitry for the system;

FIG. 4 illustrates the digital subtractor;

FIG. 5 is a diagram of a preferred arrangement; and

DESCRIPTION OF PREFERRED EMBODIMENT

Figure 6:
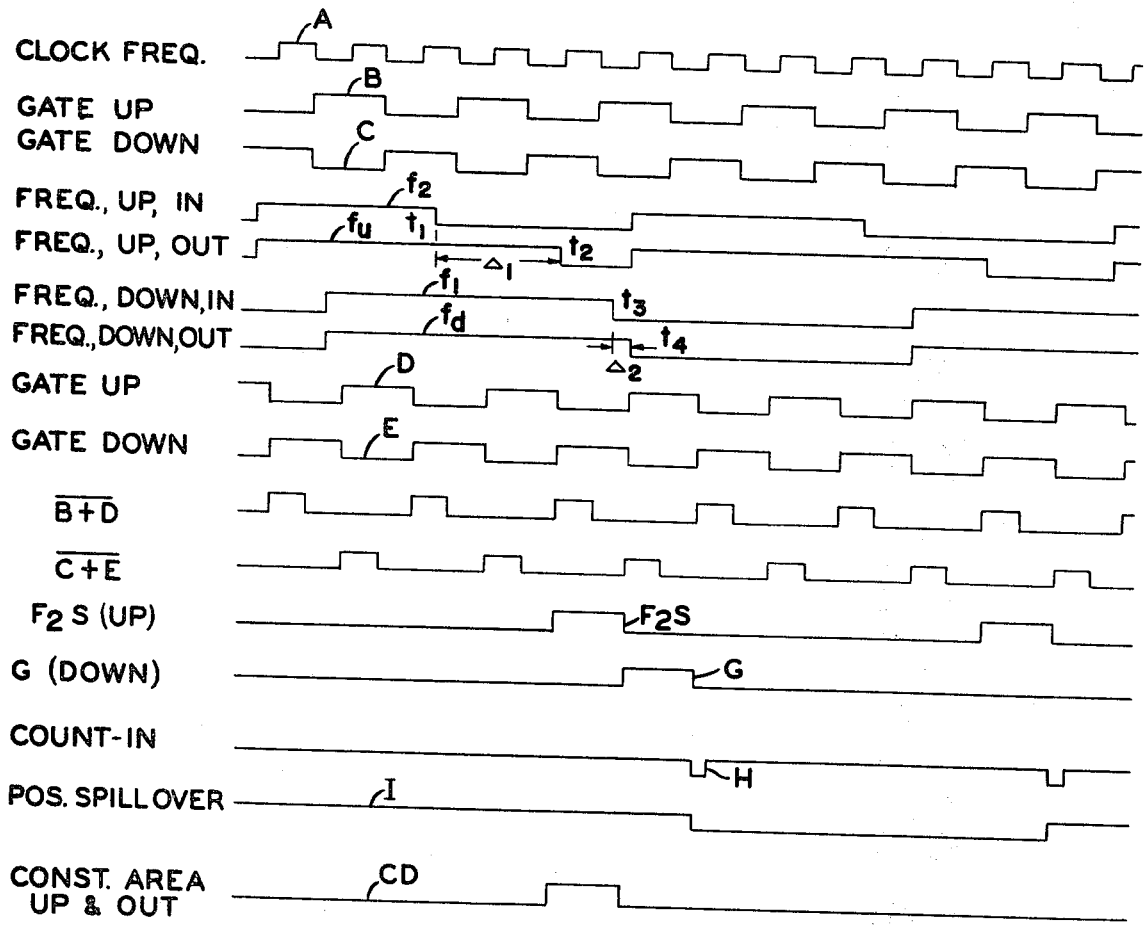
FIG. 6 is a timing diagram showing the relationship of various pulse trains in the system.

Referring now to the drawings, FIG. 1 shows a prior art arrangement for a paper mill. Head box level of semi-liquid pulp 10 is measured (and possibly ultimately controlled) by a pressure-to-frequency transducer 11, providing a frequency $f_1$ representative of so-called slice velocity as the pulp discharges out of a sluice onto a motorized wire mesh M whose speed is measured by a reluctance type pulse generator tachometer 12 providing an output pulse per increment of process travel. As the formed paper P passes on down the line, other speeds are measured by similar tachometers 13, 14 (and as many more as desired) attached to respective motorized or bridle rolls. Various frequencies, $f_1$–$f_4$, are thus produced and a comparison of them has been found useful to provide information (and control), e.g., as to draw, paper characteristics, and the like. After conventional calibration (in block 16, e.g., for transducer characteristics, roll wear, tachometer gearing, desired display as of FPM) any two frequencies to be compared were, in the past, then changed to voltages by respective frequency-to-voltage converters, 17, 18, and then the difference detected in a difference amplifier, 19, to provide an output voltage (usually D.C.) having a level representative of the frequency difference. This does not give very accurate results, as hereafter explained.

FIG. 2 functionally illustrates in basic form a preferred arrangement according to the invention. As shown, $f_1$ and $f_2$ are fed to anti-coincidence circuitry, represented by block 21. Also fed to such circuitry 21 is the output of a clocking oscillator 22 which generates pulses, preferably at a frequency at least 4½ times that of either $f_1$ or $f_2$. In the event of coincidence, of a pulse from $f_1$ in time with a pulse from $f_2$ (the condition shown), one set of pulses (e.g., $f_2$) may be shifted (see $F_2S$) although in actuality we prefer to actually shift each pulse each and every time as shown in FIG. 6 where $f_2$ changes from a high to a low state at time $t_1$, an intermediate resultant $f_u$ does not change until time $t_2$ with a shift $\Delta_1$. Pulse $f_1$ changes from high to low at time $t_3$, $f_d$ does not change until time $t_4$ with a time shift of $\Delta_2$. Thus each pulse is shifted by some amount such that the negative going transition (high to low) of $f_u$ and $f_d$ always occur at least one clock period apart (compare, $t_2$ and $t_4$, and compare final outputs, of the anti-coincidence circuit, $F_2S$ and G, in FIG. 6).

Then, referring back to FIG. 2, any difference in frequency can be directly subtracted in a digital subtractor 23 which has three modes, "0" output, "CU," a "count up" condition assumed for the condition where $f_1$ exceeds $f_2$, and "CD," a "count down" condition assumed when $f_2$ exceeds $f_1$. Subsequently, the existing one of the CU, CD alternate mode outputs, which is a pulse (if any) output, is shaped and amplified in block 26, and applied to an Operational Amplifier 28 to provide a plus, or minus (or no) Output Voltage $OV_2$, which is more accurate than the prior art ($OV_1$ of FIG. 1) by several orders of magnitude. That this is so becomes apparent by considering the original frequencies. If $f_1 = 10{,}000$ c.p.s.,
$f_2 = 10{,}100$ c.p.s., and usual error=1% in $f$ to V conversion, then, for FIG. 1, the error may be ±200 cycles, while for the FIG. 2 arrangement any error is limited to about one cycle.

Suitable circuitry for the anti-coincidence function of block 21 is shown in FIG. 3 where amplifiers 31 amplify the pulse signals $f_1$, $f_2$ and the clocking frequency $f_c$. Integrated circuits include a flip-flop 32 and an inverse (or negative) amplifier 33 which toggles a flip-flop 34 preset by $f_1$ pulses. Inversion is obtained in a NOR gate 35 to toggle another flip-flop 36 and provide one series of pulses, which we have called G, to the digital subtractor (see FIG. 4). The pulses of $f_2$ are processed similarly, like parts being like numbered as before, but in the case of $f_2$, flip-flop 34' derives its clock input from the "1" (rather than the "0") output of flip-flop 32, and flip-flop 36 is preset from a NOR gate 37' responsive to the "0" output state of a flip-flop 38 (rather than from NOR 37 and the "1" output of 38 as was the case for the $f_1$ processing flip-flop 36).

As seen in FIG. 4, for the digital subtractor 23, advantageous results are obtained by including a reversible. The pulses G ($f_1$), as derived from the anti-coincidence circuit of FIG. 3, are gated by a One-Shot pulse circuit 42 to supply a clocked (e.g., by line B) pulse output to a NOR gate 43 whose output is taken to toggle first stage (flip-flop 44) of the reversible (count) apparatus indicated within the block of the dash line 45. Pulses $f_1$ are also taken to a NOR gate 46 which provides one mode (e.g., CU) of output for the subtractor.

Similarly pulses $f_2$, from FIG. 3 are gated by a One-Shot 42' and then applied to the same NOR 43, thus to toggle 44 (first stage flip-flop) and also to toggle the second stage (of the reversible) which includes flip-flop 47 which is set and clocked by the line C from the 0 output of FF 32 (of FIG. 3) through suitable NOR gates (inverters 51, 52. As seen in FIG. 4, the reversible first and second stages through NOR's 53, 54, 55, and suitable inversion 56, 57 and final gates 46, 58 provide the alternative outputs of the subtractor and just which output line has a pulse output depends on whether $f_1 > f_2$, or $f_2 > f_1$. If neither is the case, there is no output.

The function of the two delays (41, 41') is to shut the reversible counter off in one direction when the counter reaches that limit (00 or 11). For example, if the counter has reached 11, the positive spillover will go high and 41' will shut off the One-Shot 42' for $F_2S$. Similarly, the other delay 41 uses negative spillover (for the 00 condition) to cut off the One-Shot for G ($f_1$).

In the preferred arrangement of FIG. 5, identical parts are like numbered as before. For convenience and accuracy of operation and set-up, any of the frequencies as calibrated in calibrators 31 may be read independently with an expanded scale by manipulation of a selector switch 59 comparing them (for accurate readout) with a calibrated output of the constant frequency oscillator 22. Frequency from any two adjacent transducers are also differenced, as shown, providing four frequency differences (nine in a working embodiment) and one single frequency reading (two in a working embodiment) from the five pulse inputs (ten in the working embodiment) including the oscillator.

The calibrators 31 may be of standard, well-known design, e.g., with suitable amplifiers, flip-flops, gates and thumb wheel or slide selector switches, because of the conventionality not illustrated.

In order to read a single frequency (or, through the switch 59, *any* single frequency) with an accuracy greater than heretofore, it ($f_2$ for the switch position shown) is differenced against a calibrated frequency $f_0$ derived from the oscillator so that only a small increment of difference is subject to any drift, etc., in the final digital ($f$) to analog (V) conversion in 28.

For simultaneous display (e.g., for analysis of process draw transients) the various pairs of frequencies are simultaneously processed in respective anti-coincidence 21, digital substractor 23, pulse shaping 26, and digital to analog amplifier 28 circuits, as indicated.

The pulse shaping circuits (four of the block 26 circuits being assumed for FIG. 5) may each include any of many conventional transistor-rectifier, or other, circuits designed to provide suitable switching speed, thus have not been detailed in the drawing.

The final operational amplifier 28 is desirably provided with a frequency compensation filter as by a capacitor 60-resistance 61 network. Other desirable additions are shunt connected integrating capacitor means 67 (to convert pulse train to D.C.) and range selectors such as manual switches 62, 63 connected in series with resistors 64, 65 and then in shunt from amplifier input to output. Zero set adjustment may also be provided, as from a + and − biased potentiometer 66.

SUMMARY OF OPERATION AND ADVANTAGES

Operation may best be understood from considering FIG. 6 in connection with the other drawing figures. The oscillator clocking frequency pulses (A in FIG. 6, at line A in FIG. 3) gate up ("1" on FF 32 of FIG. 3) to produce wider pulses B, and gate down ("0" of FF 32) to produce opposite pulses, C in line C (FIG. 3). Assuming $f_1$ pulse frequency is lower than $f_2$ pulse frequency, the "frequency up, in" is represented as $f_2$ and by the input so marked in FIGS. 6 and 3, respectively, and the "frequency up, out" as "$f_u$" and so marked in FIGS. 6 and 3. Similarly the "down" frequency is $f_1$, and the down frequency out (first stage) is $f_d$.

Considering next the flip-flop 38, it gates up to form pulse train D in line D, and down to form pulse train E in line E. By inversion in NOR gates 37, 37', B is inverse output added to D, and C to E, to give the pulses $\overline{B+D}$ and $\overline{C+E}$. Then, from flip-flop 36, $\overline{B+D}$ and $f_d$ provide output G, and from gate 36' $\overline{C+E}$ and $f_u$ provide $F_2S$.

Referring next to FIG. 4 (as compared with FIG. 6), a count-in to toggle FF 44, and FF 47 is in the form of small negative pulses, H. The second stage (including FF 47 of FIG. 4) provides a positive spill over, I; or a negative spill over, J, if the $f_2 > f_1$ condition is reversed. The positive spill over pulses are shown at I in FIG. 6. Next this signal is inverted (57 in FIG. 4) and applied to the NOR gate 58 to provide a constant area pulse, CD, up and out on the CD line (representative of $f_2 - f_1$).

Many modifications are possible. Preferably the equipment is all solid state and the various flip-flops and gates are supplied as commercially available plug-in integrated circuits any of which might serve functions additional to those depicted.

There is thus provided apparatus of the class described capable of meeting the objects of the invention. The flip-flops 44 and 47 (with gates 54, 55) of the reversible count means (45 in FIG. 4) just cut out if they reach either limit (00 or 11) while they are free to count up and back (e.g., 01 to 10 to 01 and so on) so long as they operate within the change of state conditions 11 for one line, 00 for the other, while as soon as either limit is hit the reversible function is rendered inoperative.

Plural speed differences are simultaneously displayed (and/or used for control) with much greater accuracy than heretofore because only a single analog signal is produced in order to display the difference; drift and other module errors being applied only to a low output frequency scale instead of to input frequency.

While we have illustrated and described particular embodiments, various modifications may obviously be made without departing from the true spirit and scope of the invention intended to be defined only by the accompanying claims taken with all reasonable equivalents.

We claim:

1. A circuit for detecting the frequency difference of first, $f_1$, and second, $f_2$, inputs of pulses which may vary in frequency from one another in pulses per second, said circuit comprising:
    a first means (21) fed by $f_1$ and $f_2$ and for establishing non-coincidence between $f_1$ and $f_2$, said first means (21) providing a pair of output trains of pulses, G and $F_2S$, respectively representative of $f_1$ and $f_2$ but without time-wise coincidence of pulses in the two output trains,
    a second means (23) fed by the first means' outputs and for digitally subtracting the smallest frequency as between $F_2S$ and G, representative of $f_2$ and $f_1$, from the largest frequency,
    said second means having two digital pulse outputs, one (CU) operative only when $f_1$ is greater than $f_2$ and the other (CD) operative only when $f_2$ is greater than $f_1$, whereby to provide a useful readout of frequency difference between said input frequencies $f_1$ and $f_2$.

2. For use in comparing absolute values of the frequencies of first and second pulse train inputs, an anti-coincidence circuit comprising:
    a source of clocking frequency,
    a first flip flop means which is toggled by said clocking frequency and which is for providing a gate up signal and for providing a gate down signal, which signals may conveniently be used for other apparatus such as a reversible counter, a second flip flop means which is connected to be set by the first pulse train input and toggled by the clocking frequency and clocked by one of the gate up, gate down signals of the first flip flop means, said second flip flop means being for producing a first output of pulses whose frequency is representative of the frequency of said first pulse train input, a third flip flop means which is connected to be set by the second pulse train input and toggled by the clocking frequency and clocked by the other of the gate up, gate down signals of the first flip flop means, and which said third means is for producing a second output of pulses with the pulses of the second output being each set apart in time from any pulse of the first output while having a frequency representative of the frequency of the second pulse input.

3. For use in comparing absolute values of the frequencies of first (G) and second ($F_2S$) pulse trains or alternatively reading out either in the absence of the other, a digital subtracting circuit comprising:

NOR gate means connected to be supplied by said first and second pulse trains and for providing a short pulse as a count-in (H) at the beginning of the condition of pulses existing in neither train, a source of clocking pulses (B, C), a reversible count apparatus connected to be supplied by said count-in (H) and by said source of clocking pulses (B, C), said reversible count apparatus comprising a plurality of flip flops toggled by said count-in (H) with at least one of the flip flops being connected to be set or alternatively cleared (clocked) by the output state of at least one other of the plurality of flip-flops and the state of the source of clocking pulses, said count apparatus having connections for deriving an output therefrom when its high limit is reached and for deriving an output when its low limit is reached, means including connections from count apparatus outputs (I, J) for gating off its count-in input (H) thereby rendering said reversible count apparatus inoperable to count therebeyond when reaching either limit of high count or low count, and means operatively associated with the count apparatus outputs (I, J) and with the first and second pulse trais (G, $F_2S$) and for deriving as alternative readouts the excess if any of first train pulses (G) over second train pulses ($F_2S$) and of second train pulses over first train pulses.

References Cited

UNITED STATES PATENTS

| | | |
|---|---|---|
| 2,795,695 | 6/1957 | Raynsford. |
| 2,985,773 | 5/1961 | Dobbie _____ 324—79 X |
| 3,329,895 | 7/1967 | Lenz. |
| 3,381,220 | 4/1968 | Burr _____ 324—82 |

OTHER REFERENCES

Taylor, J. D.: Pulse Generators and Counters Check Paper Mill Speed, Control Engineering, v. 903, p. 117.

ALFRED E. SMITH, Primary Examiner

U.S. Cl. X.R.

328—133